J. W. Byers,
Gate.
No. 90,496.   Patented May 25, 1869.
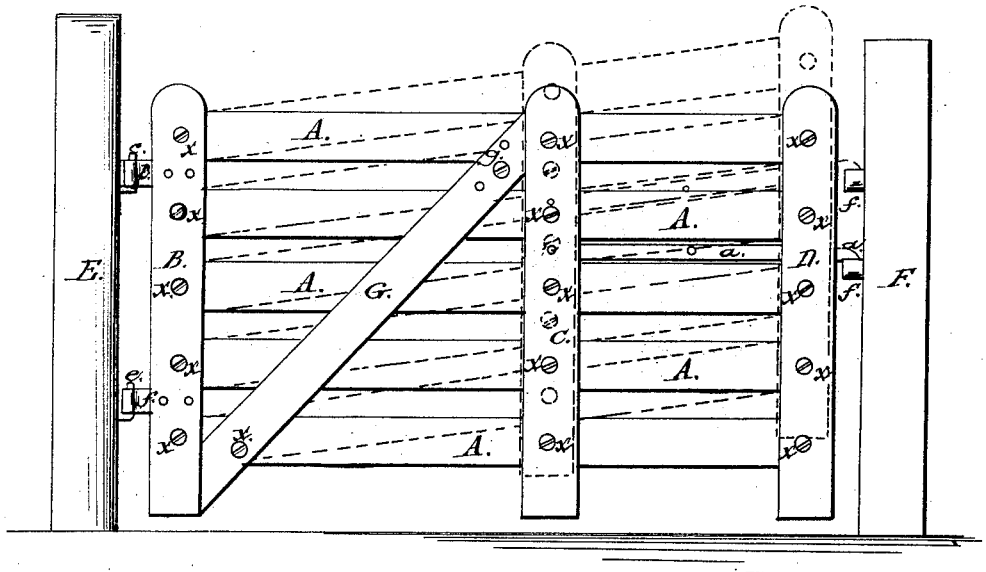

United States Patent Office.

J. W. BYERS, OF MECHANICSBURG, PENNSYLVANIA.

Letters Patent No. 90,496, dated May 25, 1869.

IMPROVEMENT IN FARM-GATES.

The Schedule referred to in these Letters Patent and making part of the same.

*To all whom it may concern:*

Be it known that I, J. W. BYERS, of Mechanicsburg, in the county of Cumberland, and in the State of Pennsylvania, have invented certain new and useful Improvements in Farm-Gates; and do hereby declare that the following is a full, clear, and exact description thereof, reference being had to the accompanying drawing, making a part of this specification, in which is represented a front elevation of my improved gate.

The nature of my invention consists in the peculiar construction and arrangement of the various parts of a gate, by means of which the front ends thereof may be elevated to and secured at various heights, so as to clear obstructions, or to allow small animals, fowls, &c., to pass beneath, without interfering with the usual operation of the same, as is fully described hereinafter.

In the annexed drawing—

A A, &c., represent a series of parallel slats, or bars, pivoted horizontally within three vertical bars or uprights, B, C, and D, two of which, B and D, are placed at the ends of said horizontal slats, while the third, C, is secured near the centre of the same, the whole forming a panel or gate.

To the rear upright, B, are secured two hinges, $b\ b$, which are of the usual form and construction, and pass over pintles $e\ e$, driven into a post, E, placed vertically in the ground.

A similar post, F, is placed at the opposite end of the gate, and provided with a suitable catch, $f$, consisting of a double incline, with a central notch, with which the outer end of a latch, $a$, is made to engage, its inner end being pivoted within the vertical bar C.

G represents a brace, extending diagonally from the inner lower corner of the upright B to the top of the upright C, said brace being pivoted at its lower end to the lower horizontal bar, and secured at its upper end by means of a pin, $g$, passing through corresponding holes in said brace and the upper bar.

Each of the uprights, B, C, and D, and the brace G, are preferably made of two pieces of board, placed upon opposite sides of the bars, and secured together by means of screws $x\ x$, &c., passing through the same; but if desired, said uprights and brace may be made of single pieces, although a gate so constructed would be less strong than if said parts were double.

It will be readily seen that this construction of the gate permits its outer end to be elevated whenever the pin $g$ is removed from the upper end of the brace, and that when thus elevated, as shown by the red lines, it may be securely held in position by passing said pin through corresponding holes in said brace and one of the upper bars, so that if a sufficient number of holes is provided, said gate can, within certain limits, be adjusted to and secured at any desired height.

For ordinary use, however, but one change of position will be required, and for such change, a second catch, $f$, is provided, and secured to the post F, at a suitable distance above the first.

It is believed that this gate possesses many advantages over any in use, as its parts are so few and simple as to enable any farmer to construct it, and while very durable, it can be furnished at a small cost, so that its general use is very certain.

Having thus fully set forth the nature and merits of my invention,

What I claim as new, and desire to secure by Letters Patent, is—

The within-described gate, consisting of the horizontal bars A A, &c., pivoted within the uprights B, C, and D, and provided with the diagonal brace G, pivoted at its lower end to the lower bar, and secured at its upper end to upper bar, by means of the pin $g$, substantially as shown, and for the purpose set forth.

In testimony that I claim the foregoing, I have hereunto set my hand, this 6th day of April, 1869.

J. W. BYERS.

Witnesses:
GEO. S. PRINDLE,
EDM. F. BROWN.